(12) United States Patent
Rosenkranz et al.

(10) Patent No.: US 8,899,898 B2
(45) Date of Patent: Dec. 2, 2014

(54) SCREW METHOD FOR FORMING A SCREW THREAD

(75) Inventors: Falk Rosenkranz, Wildhaus (CH); Corinna Achleitner, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 226 days.

(21) Appl. No.: 13/533,422

(22) Filed: Jun. 26, 2012

(65) Prior Publication Data

US 2013/0004262 A1 Jan. 3, 2013

(30) Foreign Application Priority Data

Jun. 29, 2011 (DE) .......................... 10 2011 078 256

(51) Int. Cl.
*E05B 35/04* (2006.01)

(52) U.S. Cl.
USPC .......................................... 411/411; 470/10

(58) Field of Classification Search
USPC ...................... 411/411, 387.4, 387.8, DIG. 1; 470/8–12, 84
IPC .................................................. F16B 25/0047
See application file for complete search history.

(56) References Cited

U.S. PATENT DOCUMENTS

| | | | | |
|---|---|---|---|---|
| 1,809,758 A * | 6/1931 | Rosenberg | .................... | 411/413 |
| 3,069,961 A * | 12/1962 | Baubles | ......................... | 411/398 |
| 3,094,893 A * | 6/1963 | Lindstrom | ................. | 411/387.4 |
| 3,385,340 A * | 5/1968 | Evans | ............................ | 411/310 |
| 3,395,603 A * | 8/1968 | Skierski | ..................... | 411/387.8 |
| 3,633,455 A * | 1/1972 | Larson | .......................... | 411/423 |
| 3,813,718 A | 6/1974 | Kamiya | | |
| 3,850,215 A | 11/1974 | Orlomoski | | |
| 3,875,780 A * | 4/1975 | Cochrum et al. | ................. | 72/90 |
| 3,939,512 A * | 2/1976 | Thurston et al. | ............... | 470/10 |
| 4,037,281 A * | 7/1977 | Reynolds | ........................ | 470/10 |
| 4,234,948 A * | 11/1980 | Maekawa et al. | ............ | 368/291 |
| 4,491,002 A | 1/1985 | Toropov et al. | | |

(Continued)

FOREIGN PATENT DOCUMENTS

| | | |
|---|---|---|
| CA | 2 277 476 | 5/1999 |
| CH | 546 351 | 2/1974 |

(Continued)

OTHER PUBLICATIONS

"Flachbacken-Gewindewalzen ohne Oberflachenfehler — Flat die thread rolling without surface failures" von Flanagan J D et al. Umformtechnik, Meisenbach, Bamberg. DE, Bd. 27. Nr. 4. 1. Aug. 1993 (Aug. 1, 1993). Seite 288/289, XP000396772, ISSN: 0300. 3167, see English summary.

(Continued)

*Primary Examiner* — Gary Estremsky
(74) *Attorney, Agent, or Firm* — Davidson, Davidson & Kappel, LLC

(57) ABSTRACT

In the case of a screw having at least one thread (26) that is formed by a rolling process, especially a flat-die rolling process, whereby the thread (26) consists of two ridges of material (28a, 28b) which are shaped from a blank (12) by means of cold-forming during the rolling process in such a way that the thread has a closing crease (32) where the ridges of material (28a, 28b) meet each other, it is provided that the closing crease (32) is situated in the area of a flank (30a, 30b) of the thread (26).

12 Claims, 3 Drawing Sheets

(56) References Cited

U.S. PATENT DOCUMENTS

| | | | |
|---|---|---|---|
| 6,216,510 B1 * | 4/2001 | Hashimoto | 72/103 |
| 6,371,709 B1 * | 4/2002 | Papafotiou et al. | 411/412 |
| 7,159,429 B2 * | 1/2007 | Takemasu et al. | 72/103 |

FOREIGN PATENT DOCUMENTS

| | | |
|---|---|---|
| DE | 30 50 448 | 8/1982 |
| DE | 29 704 226 | 5/1997 |
| EP | 0 533 456 | 3/1993 |
| EP | 0 623 759 | 11/1994 |
| EP | 1 281 874 | 2/2003 |
| GB | 2 063 740 | 6/1981 |

OTHER PUBLICATIONS

Search Report of EP 12 17 0822, 2 pages Sep. 26, 2012.

* cited by examiner a)

b)

c)

d)

e)

f)

g)

h)

SCREW METHOD FOR FORMING A SCREW THREAD

This claims the benefit of German Patent Application DE 10 2011 078 256.7, filed Jun. 29, 2011 and hereby incorporated by reference herein.

BACKGROUND

The invention relates to a screw having at least one thread that is formed by means of a rolling process, especially a flat-die rolling process, whereby the thread consists of two ridges of material which are shaped from a blank by means of cold-forming during the rolling process in such a way that the thread has a closing crease where the ridges of material meet each other. The invention also relates to a method for forming a screw thread on the lateral surface of an essentially cylindrical blank so as to form at least one thread, by means of rolling, especially flat-die rolling.

The invention especially relates to self-cutting screws.

So-called flat-die rolling processes are known for purposes of forming threads on screws. In this process, an essentially cylindrical blank that is to be machined is positioned between two profiled flat dies which are then moved linearly towards each other. The profiling on the flat dies then forms a thread on the lateral surface of the blank. During the rolling process, the blank is rotated between the flat dies, so that at least one continuous thread is formed circumferentially on the lateral surface. The thread is normally formed in that the profiling of the flat dies causes two ridges of material to be pressed out of the screw, and these ridges are then united during the rolling process to form a thread. A so-called closing crease is formed at the transition site between the ridges of material. The thread, however, is shaped by cold-forming, that is to say, the two ridges of material cannot be completely joined to each other by adhesive force. In other words, even though the two ridges of material are pressed against each other with a positive closure, a gap sometimes remains between these ridges, starting at the closing crease and constituting a weak spot in the material. In the prior-art methods, the closing crease is situated here precisely in the vertex of the thread.

SUMMARY OF THE INVENTION

It is an object of the invention to provide a screw, especially a self-cutting screw, that exhibits considerably better resistance to wear and tear. It is also an object of the invention to provide a method for the production of such a screw.

In order to achieve the objective with a screw of the above-mentioned type, it is provided that the closing crease is situated in the area of a flank of the thread. In the prior-art methods, in a manner of speaking, the ridges of material are pushed together towards the center of the thread uniformly from both sides, which simplifies the production since it is possible to keep the profiling of the rolling dies very simple since the highest point of the thread also corresponds to the transition site between the two ridges of material. In other words, each of the profiles only has to form one of the two flanks of the thread. Consequently, the weak spot in the material brought about by the closing crease lies in a highly stressed area, particularly in the case of thread-cutting screws, as a result of which the resistance to wear and tear of the thread and thus of the screw is reduced.

With the screw according to the invention, in contrast, the thread has an asymmetric design, whereby the profiling of the rolling dies forms one entire flank of the thread and, beyond the vertex of the thread, it also forms part of the opposite flank. The second profiling only forms the remaining part of the second flank of the thread. As a consequence, the closing crease is situated in the area of a flank and no longer in the highly stressed area at the vertex of the thread, which also constitutes the cutting edge of the thread in a self-cutting screw and which is thus highly stressed. Since there are no material weak spots in the vertex of the thread due to the closing crease, this area is considerably sturdier, as a result of which it sustains less wear and tear, especially when the screw is being screwed into extremely hard substrates.

Preferably, the closing crease is provided on the flank of the thread that faces in the direction in which the load is exerted after screwing in. Once the screw has been screwed in, the transfer of force between the screw and the substrate takes place via the flank of the thread that faces in the direction in which the load is exerted, that is to say, in the withdrawal direction. The closing crease preferably is situated on this flank of the thread, so that, when the screw is being screwed in, the closing crease is subject to a relatively small load.

The angle of the thread flanks can be adapted at will as a function of the desired area of application of the screw. In the case of self-cutting screws, especially concrete screws, however, a thread flank angle between 15° and 30° has proven to be ideal in order to ensure good cutting behavior as well as the highest possible load transfer.

The angles of the two thread flanks can also have different slants so that they can be adapted with an eye towards the desired area of application or as a function of the load transfer. Preferably, the angle of the thread flank facing in the direction in which the load is exerted is configured to be flatter, as a result of which a better load transfer can be attained between the screw and the substrate. The angle of the thread flank facing towards the tip of the screw can be configured more steeply since it does not have a load-transfer function once the screw has been screwed in. Since this thread flank is configured so as to be steeper, a self-cutting screw has to displace less material in this case, thus allowing the screw to be screwed in or to cut into the substrate more easily.

Ideally, the ratio of the outer diameter of the screw to the thread pitch is within the range from 1 to 2. This ratio has proven to be ideal to make it easy to screw in the screw while also attaining the highest possible load transfer.

The ratio of the thread height to the thread pitch is preferably within the range from 3 to 5.

As seen in the longitudinal section, the areas that are situated in front of and behind the closing crease as seen in the direction in which the load is exerted preferably have essentially the same cross-sectional surface areas, so that each profile has to displace the same amount of material when the thread is undergoing the rolling process.

Preferably, the screw is a self-cutting concrete screw.

Likewise provided according to the invention is a method for forming a screw thread on the lateral surface of an essentially cylindrical blank so as to form at least one thread, by means of rolling, especially flat-die rolling, whereby the thread consists of two ridges of material which are shaped from a blank by means of cold-forming and which are then united during the rolling process to form a thread, whereby a closing crease is formed on the thread between the ridges of material. The closing crease is situated in the area of one of the flanks of the thread.

BRIEF DESCRIPTION OF THE DRAWINGS

Additional advantages and features can be gleaned from the description below in conjunction with the accompanying drawings. These show the following.

DETAILED DESCRIPTION

Figure 1:
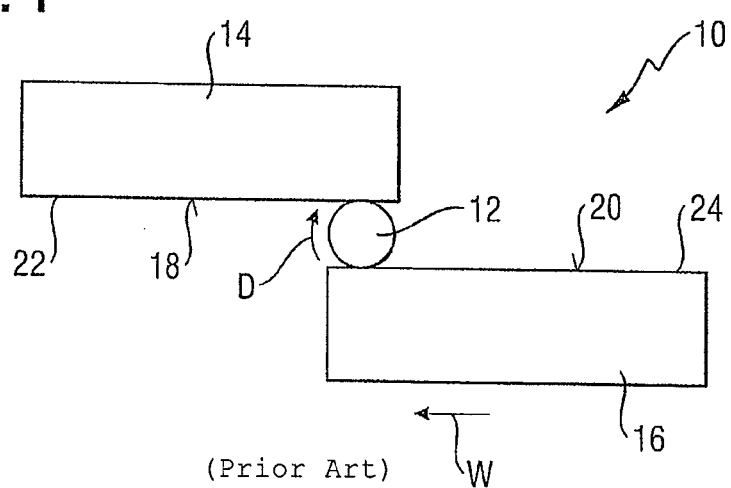
FIG. 1 a schematic depiction of a flat-die rolling process.

FIG. 1 schematically shows an arrangement 10 for rolling a thread of a screw in an essentially cylindrical screw blank 12. This arrangement consists essentially of two rolling dies 14, 16 that each have a rolling surface 18 and 20, respectively. The rolling surfaces 18, 20 are oriented parallel to each other and each have a profile 22 and 24, respectively. The first rolling die 14 is arranged so as to be stationary here, while the second rolling die 16 can be moved linearly parallel to its rolling surface 20 in a rolling direction W as well as parallel to the first rolling surface 18.

In order to form a thread, the blank 12 is positioned between the two rolling dies 14, 16, and the second rolling die 16 is subsequently moved in the rolling direction W. In this process, the blank 12 is rolled between the two rolling dies 14, 16 in a rotational direction D, whereby a thread is formed circumferentially in the blank 12 by several consecutive profiles 22, 24. For purposes of regulating the material flow, the profiles change in height, geometry and position as the rolling distance increases.

This procedure is depicted for a conventional screw for the first rolling die 14 in FIGS. 2a-f. For each thread 26, there are two profiles 22a, 22b per section for each of the rolling dies 14, 16, and these profiles 22a, 22b run towards each other in the rolling direction W on the first rolling die 14 shown here, that is to say, their distance diminishes, and in this process, their shape changes. On the second rolling die 16, the profiles run towards each other in the opposite direction.

Figure 2:
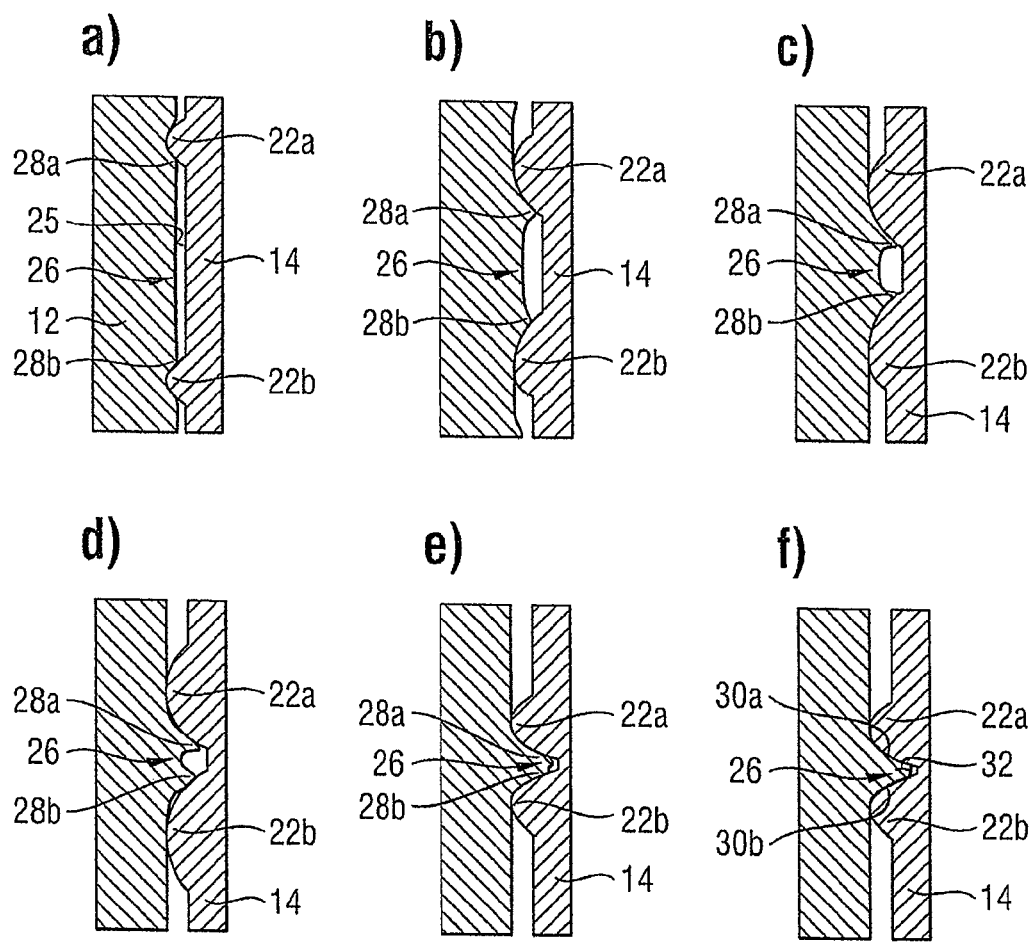
FIGS. 2a-f various sections of a rolling die according to the state of the art.

The profiles 22a, 22b are pressed (FIG. 2a) into the lateral surface 25 of the blank 12 when the rolling dies 14, 16 are moved, and over the course of the rolling process, they form two ridges of material 28a, 28b from the blank 12, and these two ridges of material 28a, 28b then form the thread 26 over the further course of this procedure (FIGS. 2b and 2c). Over the further course, the profiles 22a, 22b that run towards each other force these ridges of material 28a, 28b towards each other until the ridges of material 28a, 28b are then united to form the thread 26 (FIGS. 2d and 2e).

Therefore, each of the profiles 22a, 22b forms a flank 30a, 30b of the finished thread 26. After the completion of the rolling process, a closing crease 32 remains between the ridges of material 28a, 28b that can be hardly or not at all seen from the outside, and, as can be seen in FIG. 2f, this closing crease 32 is situated in the vertex of the thread 26, in other words, precisely on the cutting edge of the thread 26.

In contrast, FIGS. 3a to 3h show a method according to the invention for rolling a thread. The rolling dies 14, 16 for a method according to the invention are structured essentially similarly. The rolling dies 16, 14 differ only in terms of the shape of the profiles 22a, 22b, as will be explained below.

The method steps likewise correspond essentially to those of the prior-art methods. The profiles 22a, 22b press themselves into the blank 12 (FIG. 3a) and they each form a ridge of material 28a, 28b, whereby the ridges of material are forced towards each other by the profiles 22a, 22b (FIGS. 3b-d) until the ridges of material 28a, 28b are then finally united to form the thread 26 (FIGS. 3e-h).

Figure 3:
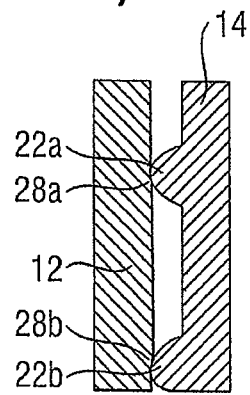
FIGS. 3a-h various sections of a rolling die used in the rolling-die process according to the invention.
Figure 3:
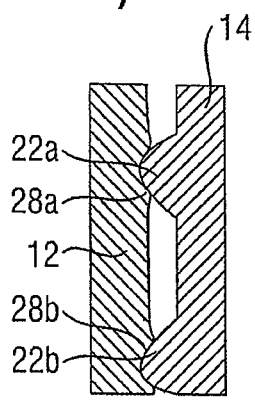
Figure 3:
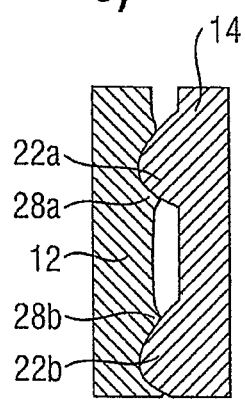
Figure 3:
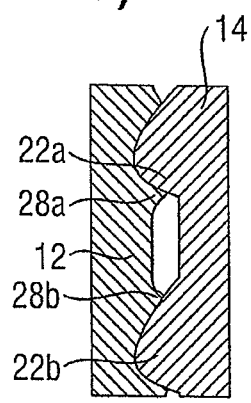
Figure 3:
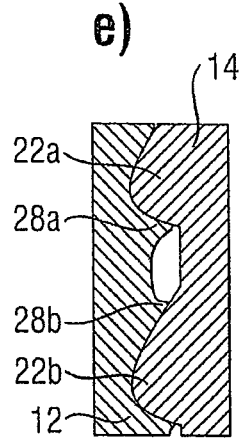
Figure 3:
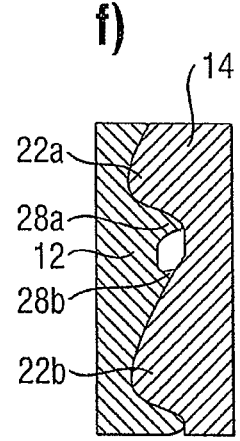
Figure 3:
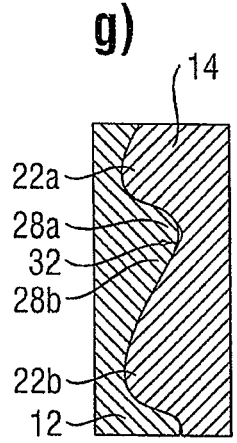
Figure 3:
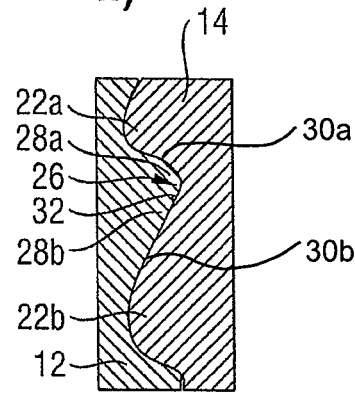

As can be seen particularly in FIGS. 3g and 3h, the profiles 22a, 22b, however, are configured in such a way that the closing crease 32 is not situated in the vertex of the thread 26, but rather, in the area of a flank 30b of the thread 26. As a result, the closing crease 32 is no longer in the highly stressed area of the vertex 31, but rather in an area on the flank 30b of the thread 26 that is subject to considerably less stress.

In other words, unlike with the prior-art methods, not every thread flank 30a, 30b is formed by one of the profiles 22a, 22b. On the contrary, one profile 22a forms the entire thread flank 30a as well as part of the thread flank 30b, while the second profile 22b merely forms the remaining part of the second thread flank 30b.

In order for the forces that occur during the rolling of the thread 26 to be uniformly distributed over both profiles 22a, 22b, the closing crease 32 is preferably situated in such a manner that, as seen in a cross section of each of the profiles 22a, 22b, the same amount of material is displaced, in other words, the cross-sectional surface areas of the ridges of material 28a, 28b are of the same size in the longitudinal extension.

Figure 4:
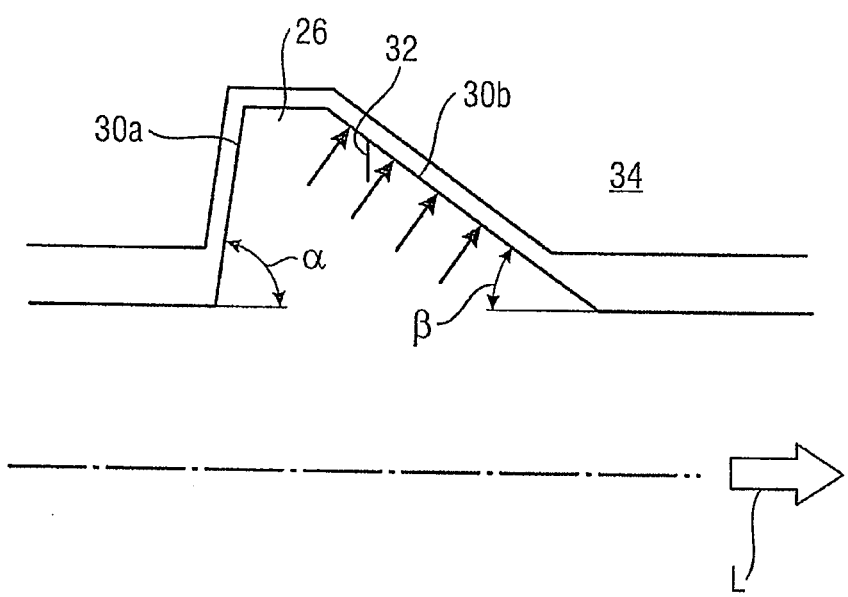
FIG. 4 a section through a screw according to the invention.

A cross section through a finished thread is shown in FIG. 4. The asymmetrical production of the thread causes the thread flanks 30a, 30b to have different flank angles $\alpha$, $\beta$. The load-exertion angle $\beta$ of the thread flank 30b, which is oriented in the withdrawal direction, that is to say, in the direction L in which the load is exerted, is configured so as to be flatter here, so as to attain a better load transfer from the substrate 34 via the thread flank 30b into the blank or into the screw. The angle $\alpha$ of the thread flank 30a facing the tip of the screw is configured so as to be considerably steeper, so that less material is displaced when the thread flank 30a cuts the thread, as a result of which it becomes easier to screw in the screw. The ideal angles for the thread flanks are between 15° and 30°.

The closing crease 32 is situated on the thread flank 30b that faces away from the direction L in which the load is exerted. The thread flank 30a without closing crease 32 then is the leading flank during screwing in or cutting.

What is claimed is:

1. A screw comprising:
   at least one thread formed by a rolling process, the thread having two ridges of material shaped from a blank by cold-forming during the rolling process in such a way that the thread has a closing crease where the two ridges of material meet each other, the closing crease being situated in an area of one of the flanks of the thread.

2. The screw as recited in claim 1 wherein the closing crease is situated on the flank of the thread facing the load-exertion direction.

3. The screw as recited in claim 1 wherein the thread flank angles of the flanks are between 15° and 30°.

4. The screw as recited in claim 1 wherein the thread flank angle of the one flank is different than that of the other flank.

5. The screw as recited in claim 1 wherein the angle of the thread flank facing in a load-exertion direction is configured to be flatter than the angle of the other thread flank.

6. The screw as recited in claim 1 wherein a ratio of the outer diameter of the screw to the thread pitch is within the range from 1 to 2.

7. The screw as recited in claim 1 wherein a ratio of the thread height to the thread pitch is within the range from 3 to 5.

8. The screw as recited in claim 1 wherein, in a longitudinal section view, areas situated in front of and behind the closing crease as seen in the load-exertion direction have similar cross-sectional surface areas.

9. The screw as recited in claim 1 wherein the screw is a self-cutting concrete screw.

10. The screw as recited in claim 1 wherein the rolling process is a flat-die rolling process.

11. A method for forming a screw thread on a lateral surface of an essentially cylindrical blank, comprising:
  forming at least one thread by rolling, the thread including two ridges of material shaped from a blank by cold-forming; and
  then uniting the two ridges during the rolling process to form the thread, a closing crease being formed on the thread between the ridges of material, the closing crease being situated in an area of one of the flanks of the thread.

12. The method as recited in claim 11 wherein the rolling is flat-die rolling.

* * * * *